US008762324B2

(12) United States Patent  (10) Patent No.: US 8,762,324 B2
Thollot et al.  (45) Date of Patent: Jun. 24, 2014

(54) MULTI-DIMENSIONAL QUERY EXPANSION EMPLOYING SEMANTICS AND USAGE STATISTICS

(75) Inventors: Raphael Thollot, Paris (FR); Nicolas Kuchmann-Beauger, Paris (FR); Corentin FollenFant, Antibes (FR)

(73) Assignee: SAP AG, Walldorf (DE)

( * ) Notice: Subject to any disclaimer, the term of this patent is extended or adjusted under 35 U.S.C. 154(b) by 113 days.

(21) Appl. No.: 13/428,941

(22) Filed: Mar. 23, 2012

(65) Prior Publication Data

US 2013/0254155 A1 Sep. 26, 2013

(51) Int. Cl.
G06F 17/30 (2006.01)
(52) U.S. Cl.
USPC .......................................... 707/602; 707/740
(58) Field of Classification Search
USPC ............. 707/1, 600, 736, 104, 713, 769, 749, 707/706, 771, 723, 740; 706/12
See application file for complete search history.

(56) References Cited

U.S. PATENT DOCUMENTS

| | | | | |
|---|---|---|---|---|
| 5,675,819 | A * | 10/1997 | Schuetze | 704/10 |
| 7,051,017 | B2 * | 5/2006 | Marchisio | 707/713 |
| 7,231,384 | B2 * | 6/2007 | Wu et al. | 1/1 |
| 7,870,117 | B1 * | 1/2011 | Rennison | 707/706 |
| 8,051,080 | B2 * | 11/2011 | Kraft et al. | 707/736 |
| 8,239,333 | B2 * | 8/2012 | Yang et al. | 706/12 |
| 8,280,892 | B2 * | 10/2012 | Marvit et al. | 707/749 |
| 2004/0064438 | A1 * | 4/2004 | Kostoff | 707/1 |
| 2004/0103092 | A1 * | 5/2004 | Tuzhilin et al. | 707/3 |
| 2005/0108001 | A1 * | 5/2005 | Aarskog | 704/10 |
| 2006/0047701 | A1 * | 3/2006 | Maybury et al. | 707/104.1 |
| 2010/0174739 | A1 * | 7/2010 | Mons et al. | 707/769 |
| 2010/0325206 | A1 * | 12/2010 | Dayal et al. | 709/204 |
| 2011/0035379 | A1 * | 2/2011 | Chen et al. | 707/740 |
| 2013/0013552 | A1 * | 1/2013 | Eshleman et al. | 707/600 |
| 2013/0073511 | A1 * | 3/2013 | Baudel et al. | 706/60 |

OTHER PUBLICATIONS

Adomavicius, G., Tuzhilin, A.: Toward the next generation of recommender systems: A survey of the state-of-the-art and possible extensions. IEEE Trans. Knowl. Data Eng. 17(6), 734{749 (2005).
Bellatreche, L., Giacometti, A., Marcel, P., Mouloudi, H., Laurent, D.: A personalization framework for olap queries. In: Proceedings of the 8th ACM international workshop on Data warehousing and OLAP. pp. 9{18. DOLAP '05, ACM, New York, NY, USA (2005).
Giacometti, A., Marcel, P., Negre, E., Soulet, A.: Query recommendations for olap discovery driven analysis. In: Proceeding of the ACM twelfth international workshop on Data warehousing and OLAP. pp. 81{88. DOLAP '09, ACM, New York, NY, USA (2009).

(Continued)

*Primary Examiner* — James Trujillo
*Assistant Examiner* — Thong Vu
(74) *Attorney, Agent, or Firm* — Fountainhead Law Group PC

(57) ABSTRACT

Embodiments relate to systems and methods employing personalized query expansion to suggest measures and dimensions allowing iterative building of consistent queries over a data warehouse. Embodiments may leverage one or more of: semantics defined in multi-dimensional domain models, user profiles defining preferences, and collaborative usage statistics derived from existing repositories of Business Intelligence (BI) documents (e.g. dashboards, reports). Embodiments may utilize a collaborative co-occurrence value derived from profiles of users or social network information of a user.

12 Claims, 12 Drawing Sheets

(56) References Cited

OTHER PUBLICATIONS

Jamali, M., Ester, M.: TrustWalker: a random walk model for combining trust-based and item-based recommendation. In: IV, J.F.E., Fogelman-Soulie, F., Flach, P.A., Zaki, M.J. (eds.) KDD. pp. 397{406. ACM (2009).

Jerbi, H., Ravat, F., Teste, O., Zurfluh, G.: Preference-based recommendations for olap analysis. In: Pedersen, T., Mohania, M., Tjoa, A. (eds.) DataWarehousing and Knowledge Discovery, Lecture Notes in Computer Science, vol. 5691, pp. 467-478. Springer Berlin / Heidelberg (2009).

Kozmina, N., Niedrite, L.: Olap personalization with user-describing profiles. In: Forbrig, P., Gnther, H., Aalst, W., Mylopoulos, J., Sadeh, N.M., Shaw, M.J., Szyperski, C. (eds.) Perspectives in Business Informatics Research, Lecture Notes in Business Information Processing, vol. 64, pp. 188{202. Springer Berlin Heidelberg (2010).

Marcel, P., Negre, E.: A survey of query recommendation techniques for datawarehouse exploration. In: Proceedings of 7th Conference on Data Warehousing and On-Line Analysis (Entrepts de Donnes et Analyse), EDA'11 (2011).

Melville, P., Mooney, R.J., Nagarajan, R.: Content-boosted collaborative fltering for improved recommendations. In: in Eighteenth National Conference on Artificial Intelligence. pp. 187{192 (2002).

Romero, O., Calvanese, D., Abello, A., Rodrguez-Muro, M.: Discovering functional dependencies for multidimensional design. In: Proceeding of the ACM twelfth international workshop on Data warehousing and OLAP. pp. 1{8. DOLAP '09, ACM, New York, NY, USA (2009).

Sarawagi, S.: User-adaptive exploration of multidimensional data. In: Proceedings of the 26th Conference on Very Large DataBases (VLDB), Cairo, Egypt, 2000.

Su, X., Khoshgoftaar, T.M.: A survey of collaborative fltering techniques. Advances in Artificial Intelligence 2009, 4:2-4:2 (Jan. 2009).

Bhide, M., Chakravarthy, V., Gupta, A., Gupta, H., Mohania, M.K., Puniyani, K., Roy, P., Roy, S., Sengar, V.S.: Enhanced business intelligence using erocs. In: ICDE. pp. 1616{1619. IEEE (2008).

Golfarelli, M., Rizzi, S., Biondi, P.: myolap: An approach to express and evaluate olap preferences. IEEE Transactions on Knowledge and Data Engineering 23, 1050{1064 (2011).

Giacometti, A., Marcel, P., Negre, E: A framework for recommending olap queries. In: Proceeding of the ACM 11th international workshop on Data warehousing and OLAP. pp. 73{80. DOLAP '08, ACM, New York, NY, USA (2008).

\* cited by examiner

FIG. 5A

| sa | 🔍 | Execute |
|---|---|---|

| Sales revenue | A measure in the domain "eFashion" |
|---|---|
| Avg of Savegoal | A measure in the domain "World cup team stats" |
| Keeper save goal | A measure in the domain "World cup team stats" |

FIG. 5B

| Sales revenue c | 🔍 | Execute |
|---|---|---|

| Sales revenue by City | A dimension in the domain "eFashion" |
|---|---|
| Sales revenue by Category | A dimension in the domain "eFashion" |

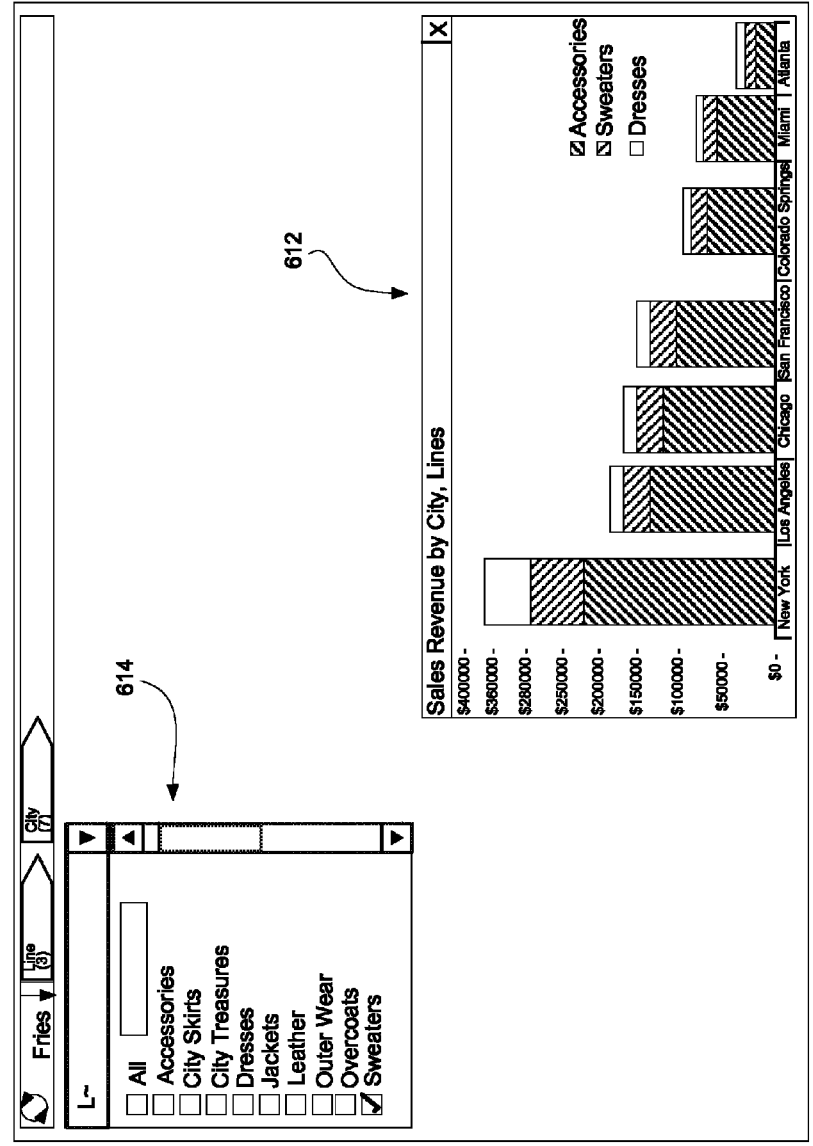

MULTI-DIMENSIONAL QUERY EXPANSION EMPLOYING SEMANTICS AND USAGE STATISTICS

BACKGROUND

Unless otherwise indicated herein, the approaches described in this section are not prior art to the claims in this application and are not admitted to be prior art by inclusion in this section.

As the volume and complexity of data stored in data warehouses continues to increase, exploration of that data for analytical purposes may be hindered. Recommender systems (RS) have grown very popular on the internet with sites like AMAZON™, NETFLIX™, and others. These systems help users explore available content related to what they are currently viewing.

Recent systems consider the use of RS techniques to suggest data warehouse queries to aid an analyst in pursuing his or her explorations. However, there is a need for even more selective approaches to creating queries for data warehouses.

The present disclosure addresses this and other issues with systems and methods allowing personalized multi-dimensional query expansion using semantics, user profiles, and/or usage statistics.

SUMMARY

Embodiments relate to systems and methods employing personalized query expansion to suggest measures and dimensions allowing iterative building of consistent queries over a data warehouse. Embodiments may leverage one or more of: semantics defined in multi-dimensional domain models, user profiles defining preferences, and collaborative usage statistics derived from existing repositories of Business Intelligence (BI) documents (e.g. dashboards, reports). Embodiments may utilize a collaborative co-occurrence value derived from profiles of users or social network information of a user.

An embodiment of a computer-implemented method comprises providing a query expansion system comprising an engine in communication with a user profile and with a business intelligence platform comprising a data warehouse, a multi-dimensional domain model, and a repository of documents. The query expansion system is caused to receive a query posed by a user to the business intelligence platform, the query comprising a measure of the multi-dimensional domain model. The engine is caused to determine a co-occurrence value for the query in the data warehouse based upon the repository of documents and a preference in the user profile. The query expansion system is caused to display to the user a query result based upon the co-occurrence value.

An embodiment of a non-transitory computer readable storage medium embodies a computer program for performing a method comprising providing a query expansion system comprising an engine, in communication with a user profile and with a business intelligence platform comprising a data warehouse, a multi-dimensional domain model, and a repository of documents. The query expansion system receives a query posed by a user to the business intelligence platform, the query comprising a measure of the multi-dimensional domain model. The engine determines a co-occurrence value for the query in the data warehouse based upon the repository of documents and a preference in the user profile. The query expansion system displays to the user a query result based upon the co-occurrence value.

An embodiment of a computer system comprises one or more processors and a software program, executable on said computer system. The software program is configured to communicate with a query expansion system comprising an engine, in communication with a user profile and with a business intelligence platform comprising a data warehouse, a multi-dimensional domain model, and a repository of documents. The software program is configured to cause the query expansion system to receive a query posed by a user to the business intelligence platform, the query comprising a measure of the multi-dimensional domain model. The software program is configured to cause the engine to determine a co-occurrence value for the query in the data warehouse based upon the repository of documents and a preference in the user profile. The software program is configured to cause the query expansion system to display to the user a query result based upon the co-occurrence value.

In certain embodiments, determining the co-occurrence value comprises causing the first engine to receive information from the document repository to determine a user-specific co-occurrence value.

According to some embodiments, determining the co-occurrence value comprises causing a second engine of the query expansion system to receive social network information of the user from the user profile to determine a collaborative co-occurrence value.

In particular embodiments, determining the collaborative co-occurrence value comprises applying a weight based upon a distance from the user in the social network information.

According to certain embodiments, the query result is presented to the user as a first link to a first dimension of the multi-dimensional domain model, together with a second link to a second query result based upon a second dimension of the multi-dimensional domain model, and the user accesses the query result comprising a chart, by activating the first link.

Particular embodiments may determine the co-occurrence value by defining a Jaccard index.

The following detailed description and accompanying drawings provide a better understanding of the nature and advantages of various embodiments.

BRIEF DESCRIPTION OF THE DRAWINGS

FIGS. 5A-B show screenshots of auto-completion used in an embodiment of an interactive query designer.

FIGS. 6A-6B show examples of screens of a user interface for a personalized query expansion system according to an embodiment.

DETAILED DESCRIPTION

The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, examples and specific details are set forth in order to provide a thorough understanding of various embodiments of the present invention. It will be evident, however, to one skilled in the art that the present invention as defined by the claims may include some or all of the features in these examples alone or in combination with other features described below, and may further include modifications and equivalents of the features and concepts described herein.

Data warehouses are designed to integrate and prepare data from production systems—the Extract Transform and Load (ETL) process—to be analyzed with BI tools. These tools allow users to navigate through and analyze large amounts of data thanks to a significant effort from IT and domain experts to first model domains of interest.

However, exploiting these multi-dimensional models may become challenging in important deployments of production systems. Indeed domain models can grow extremely complex with thousands of BI entities, measures and dimensions used, for example to build on line analytical and processing (OLAP) cubes.

In reporting and analysis tools, users can design data queries using a query panel. For instance, a user may drag and drop measures and dimensions to be used to create a new visualization (e.g., showing the "Sales revenue" aggregated by "City"). Given the number of available measures and dimensions, it is desirable to help the user to iteratively build a query.

A query expansion problem may be defined as a function QE taking as input a user u, the current query q, and additional parameters params.

This function returns a collection of scored queries $(q_i, r_i)$ such that, for all i from 1 to n, $/q_i/=/q/+1$ and $q \subset q_i$:

QE: (u, q, params) → {$(q_1, r_1); \ldots, (q_n, r_n)$}

A challenge is thus to identify candidate measures and dimensions that are best associated with q. To meet this challenge, embodiments herein describe an interactive and personalized query designer.

Figure 1:
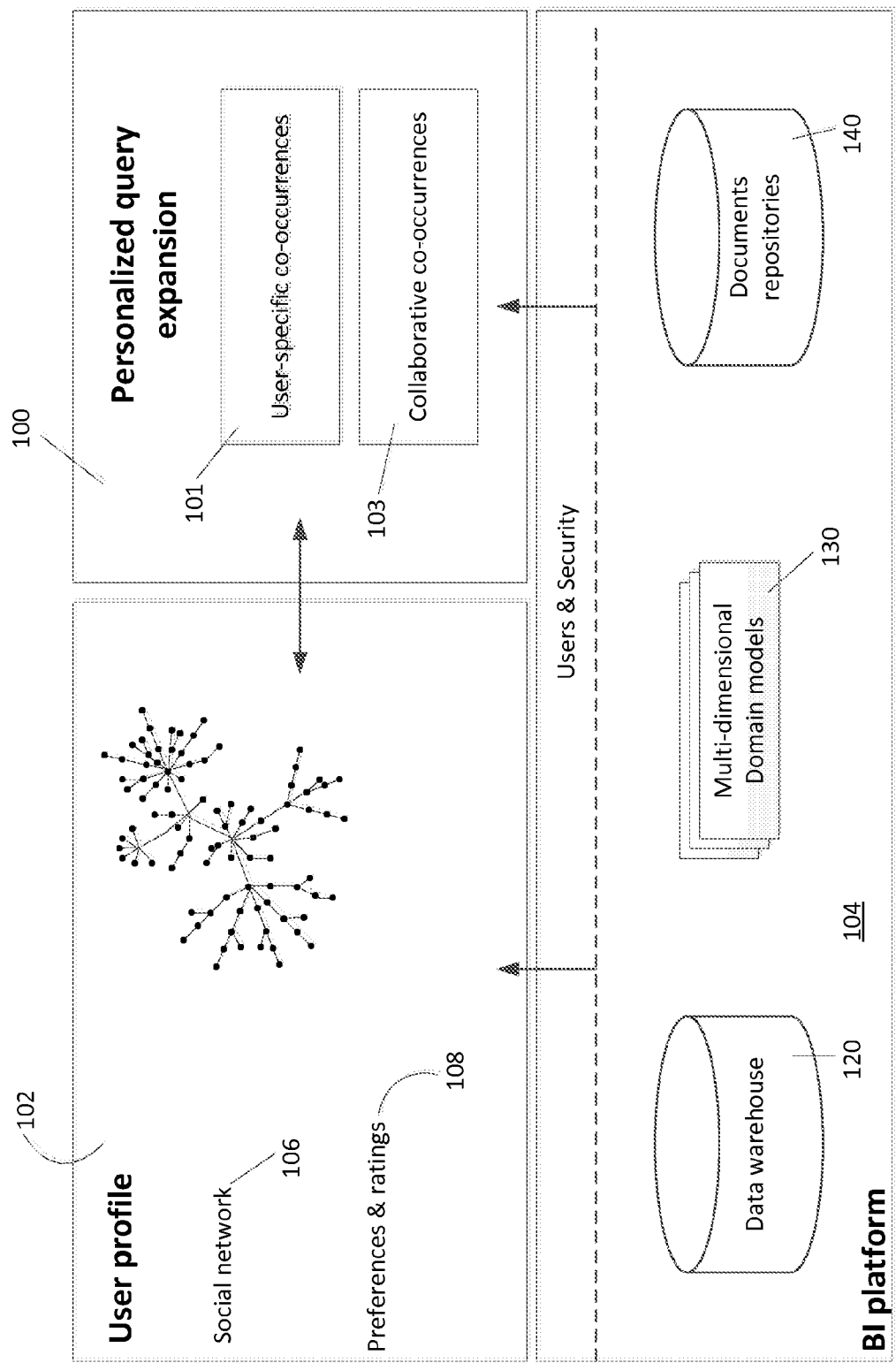
FIG. 1 shows a simplified view of an embodiment of a personalized query expansion system for multi-dimensional models.

Embodiments may leverage semantics of multi-dimensional models, user preferences, and/or collaborative usage statistics derived from repositories of BI documents, to iteratively suggest relevant measures and dimensions. FIG. 1 is a simplified view illustrating components of an architecture of a personalized query expansion system according to an embodiment.

Personalized query expansion system 100 is configured to interact with both a user profile 102 and a business intelligence platform 104. In particular, the personalized query expansion system is configured to receive relevant information from the data warehouse(s) 120, multi-dimensional domain model(s) 130, and document repositories 140 present in the BI platform.

The query expansion system 100 comprises a first engine 101 that is configured to determine a co-occurrence value based upon user-specific information present in the user profile. Such information can comprise preference and rating information 108 of the user profile. Determination of a user-specific co-occurrence value according to particular embodiments is discussed in detail below.

The query expansion system 100 also comprises a second engine 103 that is configured to determine a co-occurrence value that takes into account the relationship between a user and another entity (such as another user). Such a collaborative co-occurrence value can be determined based upon data from a social network 106 of the user profile. Determination of the collaborative co-occurrence value according to particular embodiments is also described in detail below.

Semantics of Multi-Dimensional Domain Models

A BI platform may include one or more multi-dimensional models. Such multi-dimensional models for DW's define concepts of the business domain with key indicators (measures) and axis of analysis (dimensions).

Measures comprise numerical facts that can be aggregated against various dimensions. For instance, the measure "Sales revenue" could be aggregated (e.g. from unit sales transactions) on dimensions "Country" and "Product" to produce the revenue generated by products sold in different countries.

Business domain models are used to query the DW for actual data and to perform calculations. A DW may be materialized as a relational database, and queries may be expressed accordingly, for instance as structured query language (SQL).

From a calculation point of view, it is also possible to build multi-dimensional OLAP cubes. Measures are aggregated inside the different cells of the cube formed by dimensions. Queries can be expressed on these cubes, e.g., with Multi-Dimensional eXpressions (MDX). Beyond this, modern DW's provide SQL/MDX generation algorithms to enable non-expert users to formulate ad-hoc queries.

Figure 1A:
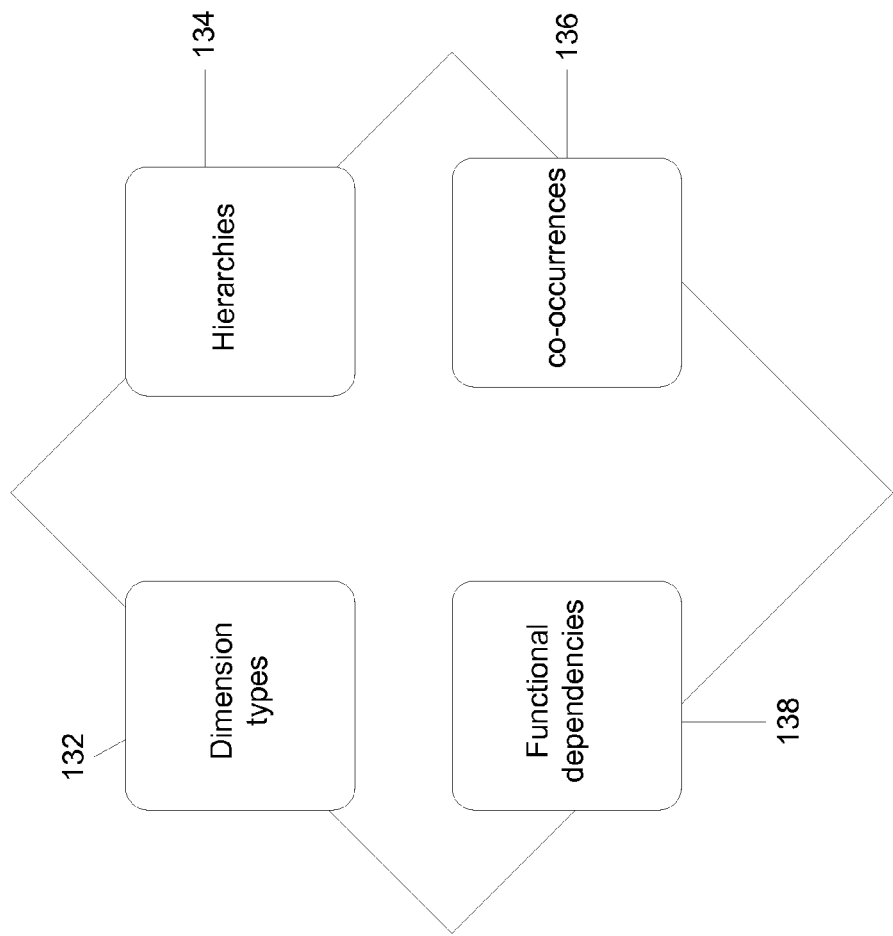
FIG. 1A shows various forms of information that may be present in the system of FIG. 1, that can be leveraged for query expansion according to embodiments.

FIG. 1A shows various forms of information that may be present in the system of FIG. 1, that can be leveraged for query expansion according to embodiments. For example, a multi-dimensional model 130 may be annotated to include dimension types 132. Multi-dimensional domain models may also define hierarchies 134.

Two other forms of information shown in FIG. 1A that may be leveraged for query expansion according to embodiments, are co-occurrences 136 and functional dependencies (between measures and dimensions) 138. Co-occurrences may be identified from user-specific and/or a collaborative perspectives, as is discussed in detail later below.

Regarding functional dependencies, two objects (measures or dimensions) may be said to be functionally dependent if one determines the other. For instance, knowing the "City" determines the related "State".

Another example involving a measure and a dimension, is that the "Sales revenue" is determined by a "Customer". That is, "Sales revenue" may be aggregated from unit sales in a fact table.

Functional dependencies are transitive. That is, if A determines B which determines C, then A determines C.

In a simple scenario, all measures are determined by all dimensions. This is the case when using a basic dataset, for instance reduced to one fact table with dimensions in a star schema.

Figures 2, 2A:
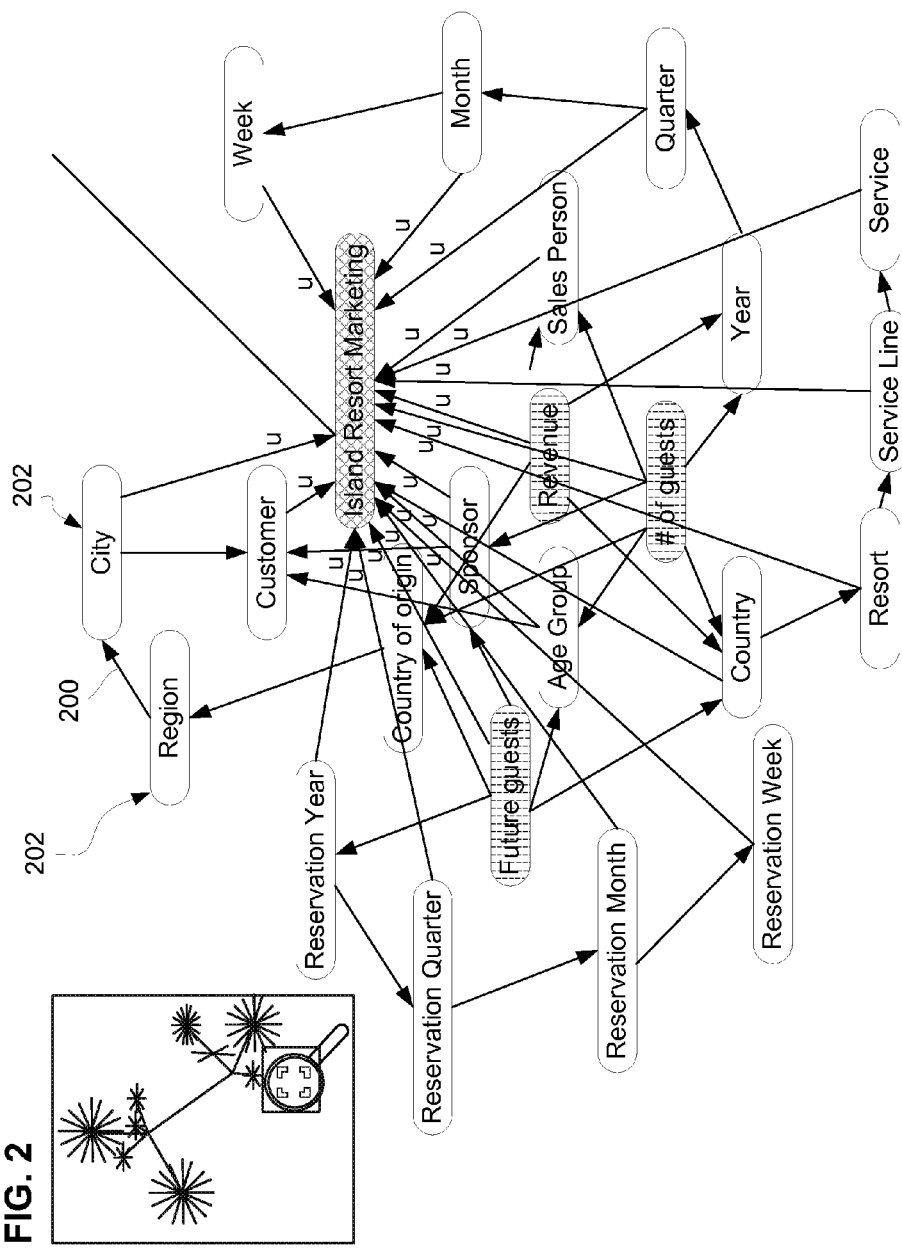
FIG. 2 is a view illustrating various functional dependencies between measures in a data warehouse relating to marketing information for a vacation resort.
FIG. 2A is an enlargement of a portion of FIG. 2.

FIG. 2 is a view illustrating various functional dependencies between measures in a data warehouse relating to marketing information for a vacation resort (Island Resorts). FIG. 2A is an enlargement of a portion of FIG. 2 showing functional dependencies 200 between measures 202.

Functional dependencies may be considered in order to compose meaningful queries. For instance, functional dependencies can be used to ensure that suggested queries do not contain incompatible objects that prevent their execution.

However, business domain models do not necessarily capture and expose this functional dependency information. Hierarchies of dimensions are more common, and may be exploited in reporting and analysis tools to permit the drill-down operation. For instance, if a "Year–Quarter" hierarchy is defined, the result of a user drilling down on "Year 2010" is a more fine-grained query with the "Quarter" dimension, filtered on "Year=2010".

If hierarchies of dimensions can be used to determine minimal dependency chains, techniques may aid in the automatic detection of functional dependencies. For example, domain ontologies may be created from conceptual schemas and use inferencing capabilities.

Usage statistics in BI documents

Functional dependencies and hierarchies provide structural knowledge regarding associations between BI entities. Beyond this, some BI platforms comprise repositories of documents (e.g. reports, dashboards) which can be used to compute actual usage statistics for measures and dimensions. Such information can be valuable because query expansion implies finding the best candidate to associate to a given set of measures and dimensions.

The structure of BI documents may be used to define co-occurrences between measures and dimensions. For instance, BI reports are roughly comprised of sections which may contain charts, tables, text areas for comments, etc.

Charts and tables define potentially significant units of sense. Measures and dimensions associated in a same table/chart, may be related and represent an analysis of specific interest to the user. Similarly, dashboards can be comprised of different pages or views including charts and tables.

Figures 3, 3A:
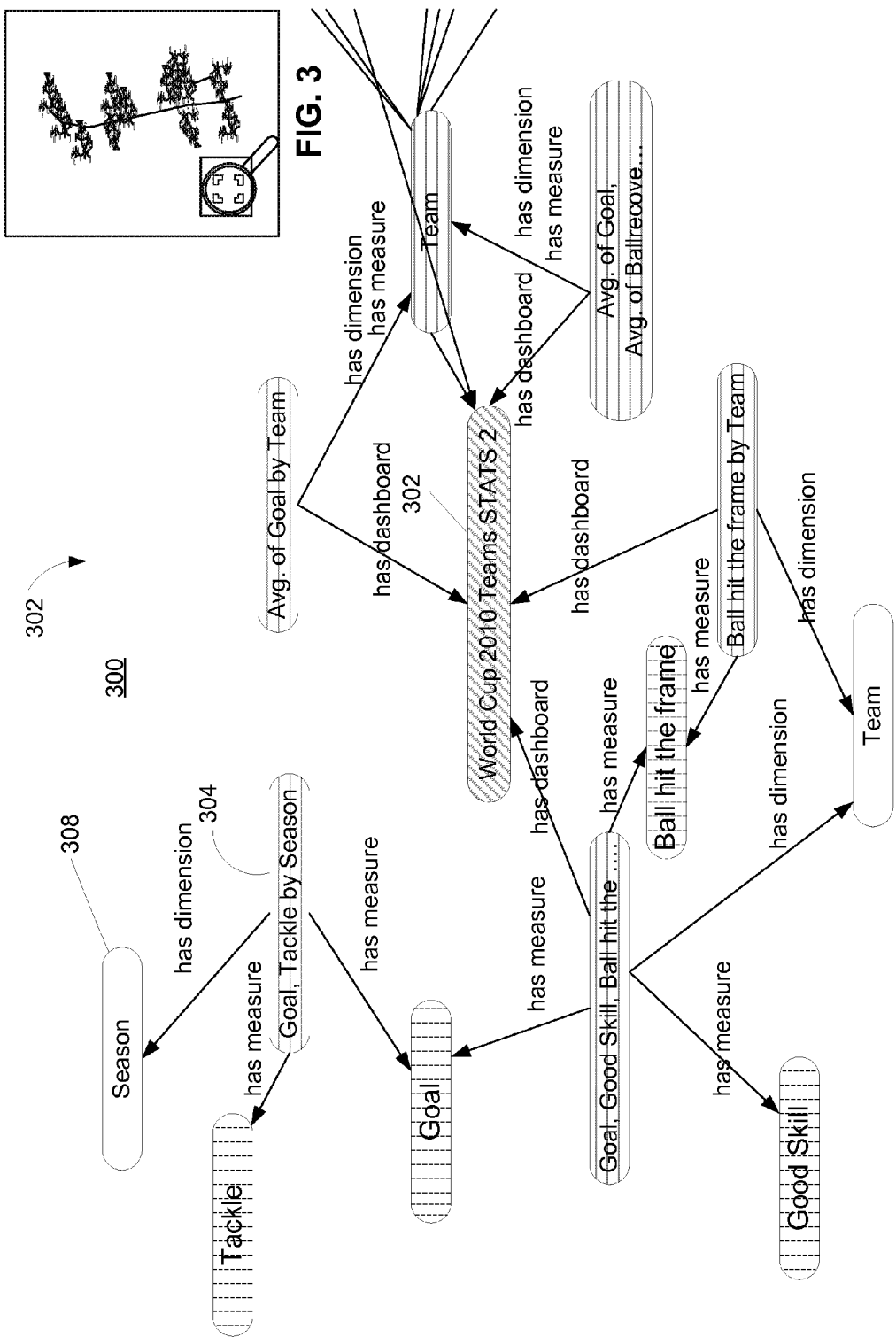
FIG. 3 illustrates a graphical representation of a dashboard presenting usage statistics.
FIG. 3A is an enlargement of a portion of FIG. 3.

FIG. 3 illustrates a graphical representation of a dashboard presenting usage statistics. FIG. 3A is an enlargement of a portion of FIG. 3. In particular, this is a graphical representation of the dashboard "World Cup Team STATS 2" and its associated charts with relevant data. Graphical representation 300 comprises a dashboard 302 and associated charts 304 with referenced measures 306 and dimensions 308.

Of course, embodiments are not limited to the specific example of FIG. 3. More generally, any BI document referencing measures and dimensions could be used to derive consolidated co-occurrences or usage statistics.

As shown in FIG. 1, the personalized query expansion system may comprise engine 101 for determining co-occurrence values specific to a user, and engine 103 for determining co-occurrence values reflecting collaboration.

Certain embodiments may utilize a personal co-occurrence value. BI platforms provide access control rules for business domain models and documents built on top of them. Consequently, different users may not have access to the same models, or at a more fine-grained level may not have access to the same measures and dimensions.

Moreover, repositories include documents generated by and shared (or not shared) between different users of the system. As a result, a value of co-occurrence discussed herein may be inherently personalized.

For example, consider a user u, with $occ_u(e_i)$ denoting the set of charts and tables visible to the user u, referencing a BI entity $e_i$, measure or dimension. The Jaccard index is a simple but commonly used value of the similarity between two sample sets. Accordingly, the co-occurrence of two entities $e_1$ and $e_2$ may be defined as the Jaccard index of the sets $occ_u(e_1)$ and $occ_u(e_2)$:

$$cooc_u(e_1, e_2) = J(occ_u(e_1), occ_u(e_2)) = \frac{|occ_u(e_1) \cap occ_u(e_2)|}{|occ_u(e_1) \cup occ_u(e_2)|} \quad (1)$$

Certain embodiments may employ a collaborative co-occurrence value. One issue involves cold-start users and coverage. In recommender systems (RS), the coverage is the percentage of items that can actually be recommended, similar to the concept of recall in information retrieval. Formula (1) may present an issue for cold-start users (i.e. those new to the system). Indeed, such users may not have stored documents from which co-occurrences can be computed.

Collaborative RS may introduce the contribution of other users in the item scoring function, to improve the system's coverage and enable the exploration of resources previously unknown (or unused) by the user. A simple approach uses a linear combination of the user-specific value and the average over a set of users.

Embodiments may utilize a social/trust network to provide the collaborative co-occurrence value. The simple approach previously described broadens the collaborative contribution to "the whole world" with users having the same weight. Trust-based RS may consider a user's social network, e.g. favoring users close to the current user.

Such narrowing of the collaborative contribution to proximate users may present benefits on at least two levels. First, the results may be more precisely personalized. Second, potential pre-computation may be reduced.

Let SN(u) represent the set of users in u's social network, which can be filtered to keep only users up to a certain maximum distance. The following refined co-occurrence value may be used, where α and β are positive coefficients to be adjusted experimentally such that α+β=1:

$$cooc(u, e_1, e_2) = \qquad (2)$$
$$\alpha \cdot cooc_u(e_1, e_2) + \frac{\beta}{|SN(u)|} \sum_{u' \in SN} (u) \frac{1}{d(u, u')} cooc_{u'}(e_1, e_2)$$

This value $cooc(u; e_1; e_2)$ is defined for entities $e_1$ and $e_2$ exposed to the user u by access control rules. The contribution of each user u' is weighted by the inverse of the distance d(u, u').

Relations between users can be obtained from a variety of sources, including popular social networks on the Web. However, this may not necessarily match corporate requirements, since users of the system are actual employees of a same company.

Figure 4:
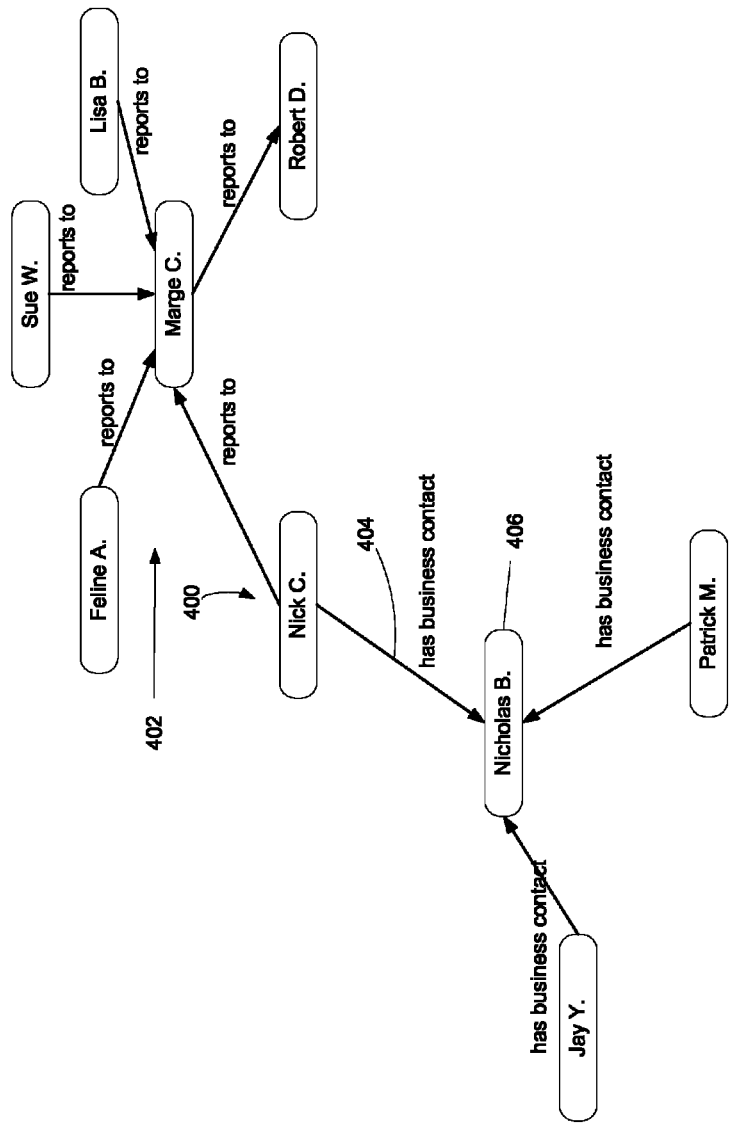

In this context, enterprise directories can be used to extract, e.g., (hierarchical) relations between employees. FIG. 4 is a simplified view of showing the relationship of an active user 400 within a hierarchy 402 of other employees.

Other types of relations arising from the construction of a social network may also be considered. For example, FIG. 4 also shows the existence of a business contact 404 between the active user 400 and a third party 406.

According to certain embodiments, a personalized query expansion component may leverage models semantics, co-occurrences, and/or user preferences. User preferences may be explicit (here $pref_{u,expl}$) or implicit (here $pref_{u,impl}$).

For a given entity e, the user's preference function $pref_u$ is defined as a linear combination of both preferences, for instance simply:

$$pref_u(e) = \frac{1}{2}(pref_{u,impl}(e) + pref_{u,expl}(e)) \quad (3)$$

Explicit preferences are feedback received from the user, e.g., in the form of ratings (in [0, 1]) assigned to measures and dimensions. Here, $r_{u,e}$ is the rating given by u to e, and $\bar{r}_u$ the average rating given by u. We define $pref_{u,expl}(e) = r_{u,e}$ if u has already rated e, and $pref_{u,expl}(e) = \bar{r}_u$ otherwise.

Implicit preferences can be derived from a variety of sources, for instance by analyzing logs of queries executed in users' sessions. Occurrences of BI entities in documents manipulated by the user may be considered as a simple indicator of such preferences:

$$pref_{u,impl}(e) = \frac{|occ_u(e)|}{\max_{e'} |occ_u(e')|} \quad (4)$$

Embodiments may assist the user in the query design phase, by offering suggestions of measures and dimensions she could use to explore data. When she selects a measure or a dimension, it may be added to the query being built. Suggestions are refreshed to form new consistently augmented queries.

Ranking may be achieved as follows. To complete a given query $q=\{e_1, \ldots, e_n\}$ with an additional measure or dimension, candidate entities are found and ranked. Candidate entities, $c_j$, $j=1 \ldots p$, are those defined in the same domain and compatible with every $e_i$, determined using functional dependencies.

The following personalized function may be used to rank each candidate $c_j$:

$$rank_u(c_j, q) = \begin{cases} pref_u(c_j) & \text{if } q = \phi \\ pref_u(c_j) \cdot \frac{1}{n} \sum_{i=1}^{n} cooc(u, c_j, e_i) & \text{otherwise} \end{cases} \quad (5)$$

To conclude with the notation of the query expansion problem introduced above, the component QE is defined as follows:

QE: (u, q, params)→{$(q_1, rank_u(c_1, q)), \ldots, (q_p, rank_u(c_p, q))$}

Beyond ranking, suggestions of the query expansion component can be fine-tuned using various parameters. Examples of such parameters include but are not limited to:

the maximum number of results;

the type of suggested entities can be limited to measures and/or dimensions;

the domain can be restricted to a list of accepted models; and/or suggested dimensions can be grouped by and limited to certain hierarchies. This may be used to reduce the number of suggestions and encourage the user explore varied axis of analysis.

Example: Auto-Completion in a Query Designer

The following describes results obtained from implementing a prototype interactive query designer. This example simply presents a search text box to the user. As the user types, candidate measures and dimensions are proposed as auto-completion suggestions.

FIGS. 5A-B are screenshots of auto-completion used in an interactive query designer of this example. FIG. 5A shows measures (from distinct domain models) suggested when the user starts typing the successive characters "sa": "Sales revenue", "Avg of savegoal", and "Keeper save goal".

Figure 5C:
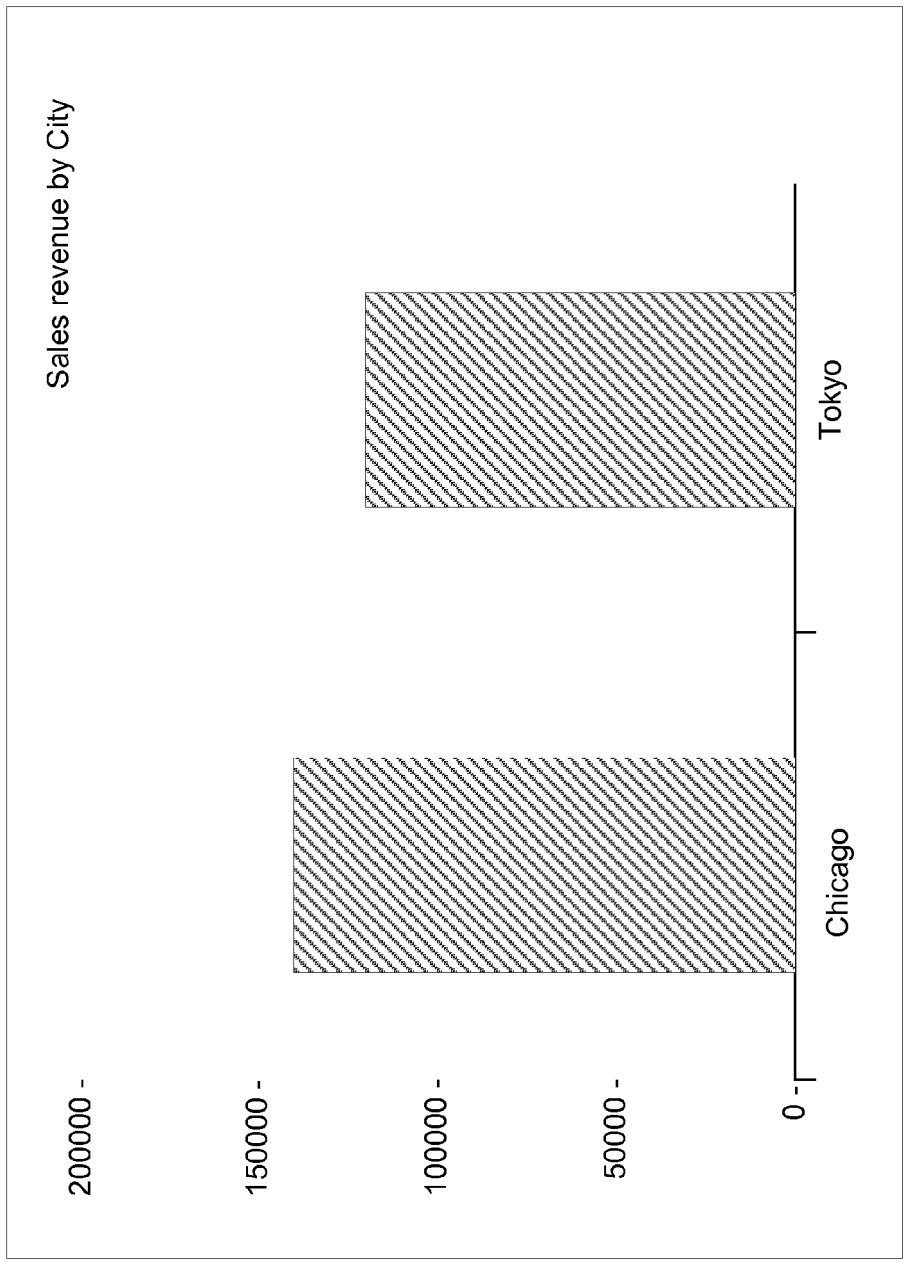
FIG. 5C shows a sample visualization that can be constructed with a query formulated in FIGS. 5A-B.

FIG. 5B shows the user selecting the first suggestion "Sales revenue", and continuing to type the character "c". The system suggests the two dimensions "City" and "Category". FIG. 5C shows a sample visualization that can be built with the query "Sales revenue by City".

Auto-completion initialization may call for the user to roughly know the names of objects sought to be manipulated. To help the user get started and explore available data, suggestions can be proposed to the user before typing starts. For example, the most commonly used measures and dimensions of various domain models could be suggested to start with.

This example relies upon the BI platform SAP BI 4™. For reporting and dashboarding solutions, this particular example utilized WebIntelligence™ and SAP BusinessObjects Explorer™ (or Exploration Views). Co-occurrences were computed using dashboards accessible through the demonstration account of SAP Exploration Views™ on-demand.

This account exposed nine (9) dashboards containing thirty-one (31) charts. The seven (7) underlying domain models define fifty-four (54) dimensions and eighty-six (86) measures.

The following table presents the five (5) dimensions having the highest co-occurrence with a given measure named "Sales Revenue".

| Measure | Dimension | Co-occurrence |
|---|---|---|
| Sales Revenue | Quarter | 0.38 |
| | State | 0.25 |
| | Year | 0.25 |
| | Category | 0.25 |
| | Lines | 0.22 |

For social networking aspects, this specific example builds on the prototype Social Network Analyzer. In particular, the application program interfaces (APIs) of this prototype expose the user's social graph at a depth of two.

According to certain embodiments, query expansion may provide the user with suggestions regarding the form of the co-occurring information. For example, the following table breaks out co-occurrence between the container type of the information (e.g. whether present in table or chart form).

| | | | Container Type | |
|---|---|---|---|---|
| Measure | Dimension | Co-occurrence | Table | Chart |
| All Project Costs | Project name | 0.27 | 0.80 | 0.20 |
| | Client | 0.18 | 0.67 | 0.33 |
| | External ID | 0.13 | 1 | 0 |
| | Org Unit | 0.13 | 1 | 0 |
| | Status | 0.09 | 1 | 0 |

In view of this, a user would want to formulate a query for "Project Costs" by "Project name", to display in the form of a Table having a higher incidence of co-occurrence.

Figure 6A:
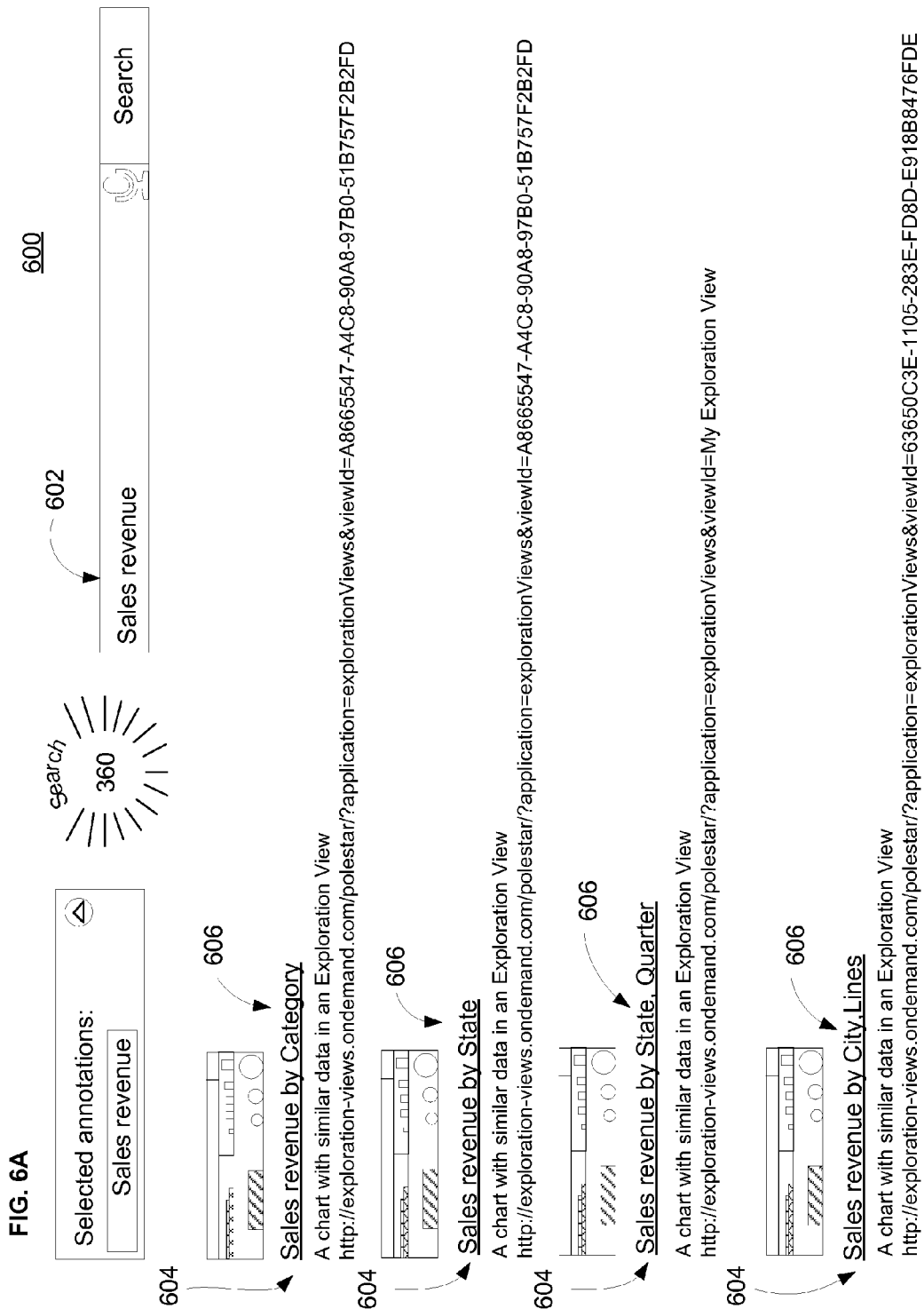

FIGS. 6A-6B show examples of screens of a user interface for a personalized query expansion system according to an embodiment. FIG. 6A shows the user input screen 600, wherein the user has selected the measure "Sales Revenue" 602, and is provided with a series of links 604 and thumbnails for displaying the result of performing that query along different dimensions 606 (e.g. "Category", "State", "State, Quarter", "City, (product) Lines").

Clicking on one of the links allows the user to quickly visualize the query on a dashboard. For example, FIG. 6B shows a sample dashboard view 610 of the result of querying the measure "Sales Revenue" along the dimension "City, (product) Lines". While this dashboard shows the query result in the form of a single (bar) chart 612, in alternative embodiments the information could be displayed in more than one form (e.g. bar chart, pie chart, numerical plot etc.) The dashboard also provides the user with a menu 614 to further refine the query in an interactive way by selecting particular product lines.

In summary, embodiments comprise a personalized query expansion system that may leverage: semantics of multi-dimensional domain models, usage statistics derived from (co-) occurrences of measures and dimensions in repositories of BI documents, and/or user preferences. A prototype of interactive query designer was created to assist a user with auto-completion suggestions.

In particular embodiments, the search-like interface of FIGS. 5A-6B could be extended. For example, charts—from existing reports and dashboards—could be retrieved with similar data. Also, user preferences and (co-)occurrences may be used in a question answering system, for example to aid in personalized query reformulation.

Some embodiments may employ recommendations in the context of DWs and BI platforms benefiting from techniques developed in the RS area. Consideration of specific semantics of multi-dimensional models may be used to provide relevant structured analytics.

Figure 9:
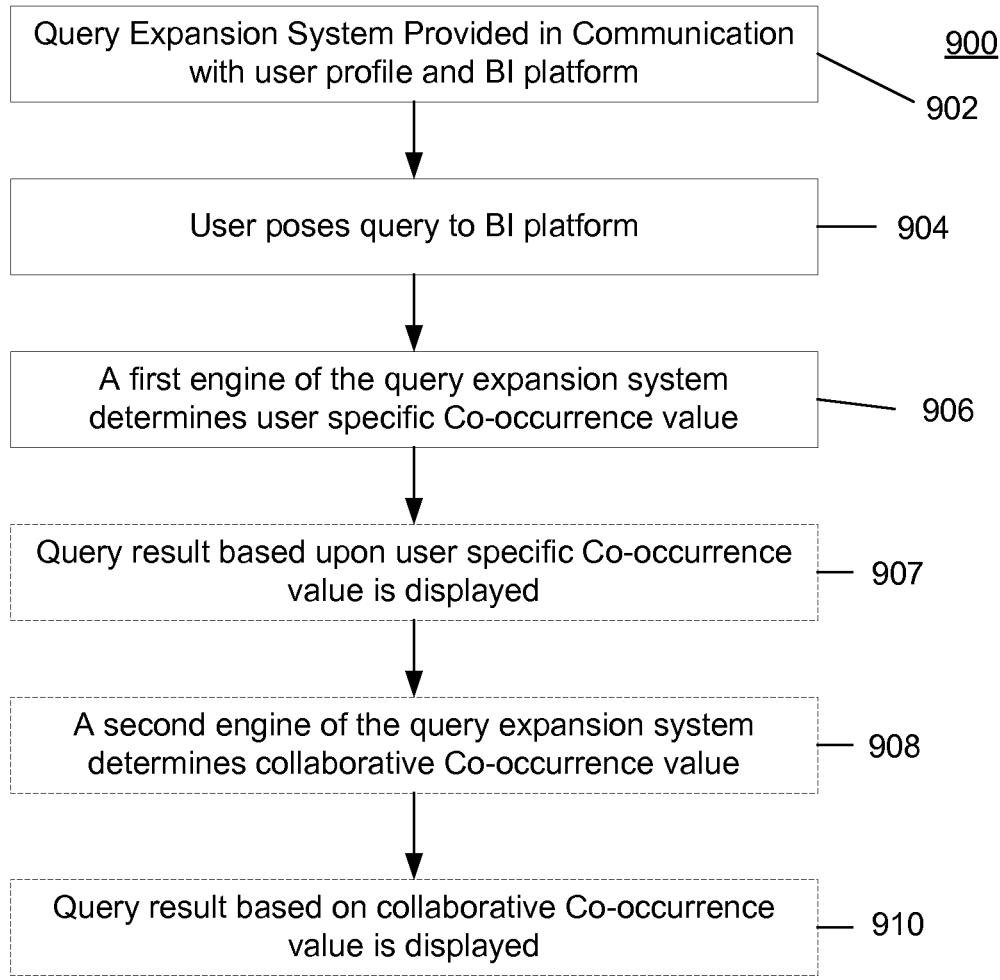
FIG. 9 presents a simplified flow diagram of a process of query customization according to an embodiment.

To summarize, FIG. 9 presents a simplified flow diagram of a process 900 of query customization according to an embodiment. In a first step 902 a query expansion system comprising a first engine and a second engine, is provided in communication with a user profile and with a business intelligence platform comprising a data warehouse and a multi-dimensional domain model.

In a second step 904, a user poses to the business intelligence platform, a query comprising a measure and a dimension of the multi-dimensional domain model.

In a third step 906, the first engine determines a user-specific co-occurrence value for the query based upon preferences of the user profile, and the multi-dimensional domain model.

In an optional fourth step 907, the personalized query expansion system may proceed to display to the user a query result based upon the user-specific co-occurrence value.

In an optional fifth step 908, however, the second engine may further determine a collaborative co-occurrence value for the query based upon social network information of the user profile, and the multi-dimensional domain model.

Thus in an optional sixth step 910, the personalized query expansion system may display to the user a query result based upon the collaborative co-occurrence value.

Figure 7:
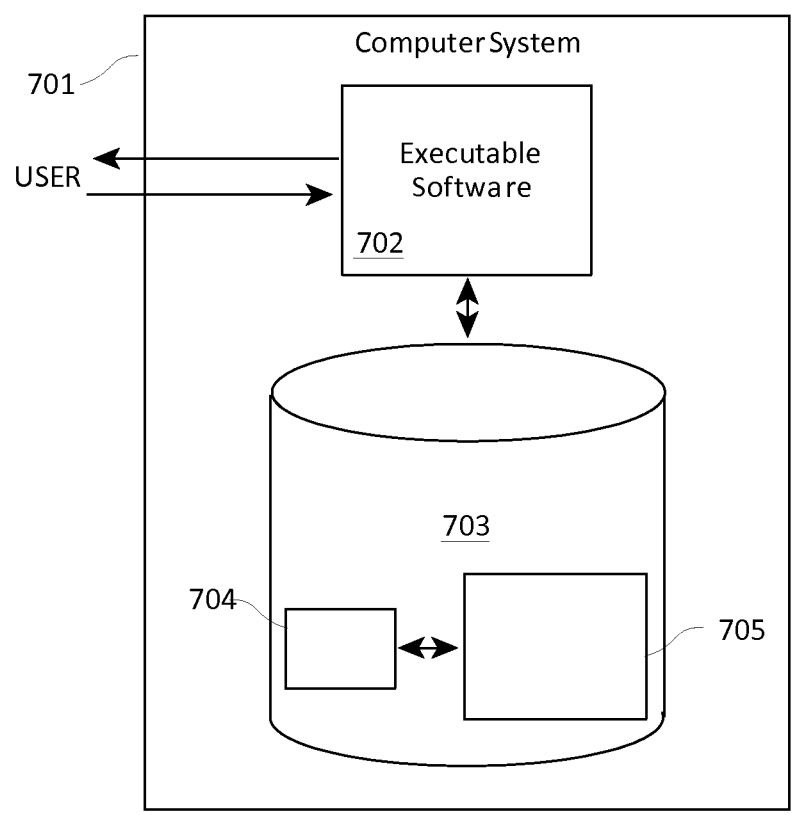
FIG. 7 illustrates hardware of a special purpose computing machine which may be configured to implement query expansion in accordance with particular embodiments.

FIG. 7 illustrates hardware of a special purpose computing machine. This computing machine may be configured to implement query expansion in accordance with particular embodiments.

In particular, computer system 700 comprises a processor 702 that is in electronic communication with a non-transitory computer-readable storage medium 703. This computer-readable storage medium has stored thereon code 705 corresponding to an engine responsible for determining a user-specific co-occurrence value of a personalized query expansion system. Code 704 corresponds to the engine responsible for determining a collaborative co-occurrence value of a personalized query expansion system. Code may be configured to reference data stored in a database of a non-transitory computer-readable storage medium, for example as may be located in a remote database server, or as may be present in the mobile device.

Embodiments of may be run in conjunction with a computer system which may comprise a software server. A number of software servers together may form a cluster, or logical network of computer systems programmed with software programs that communicate with each other and work together to process requests.

Figure 8:
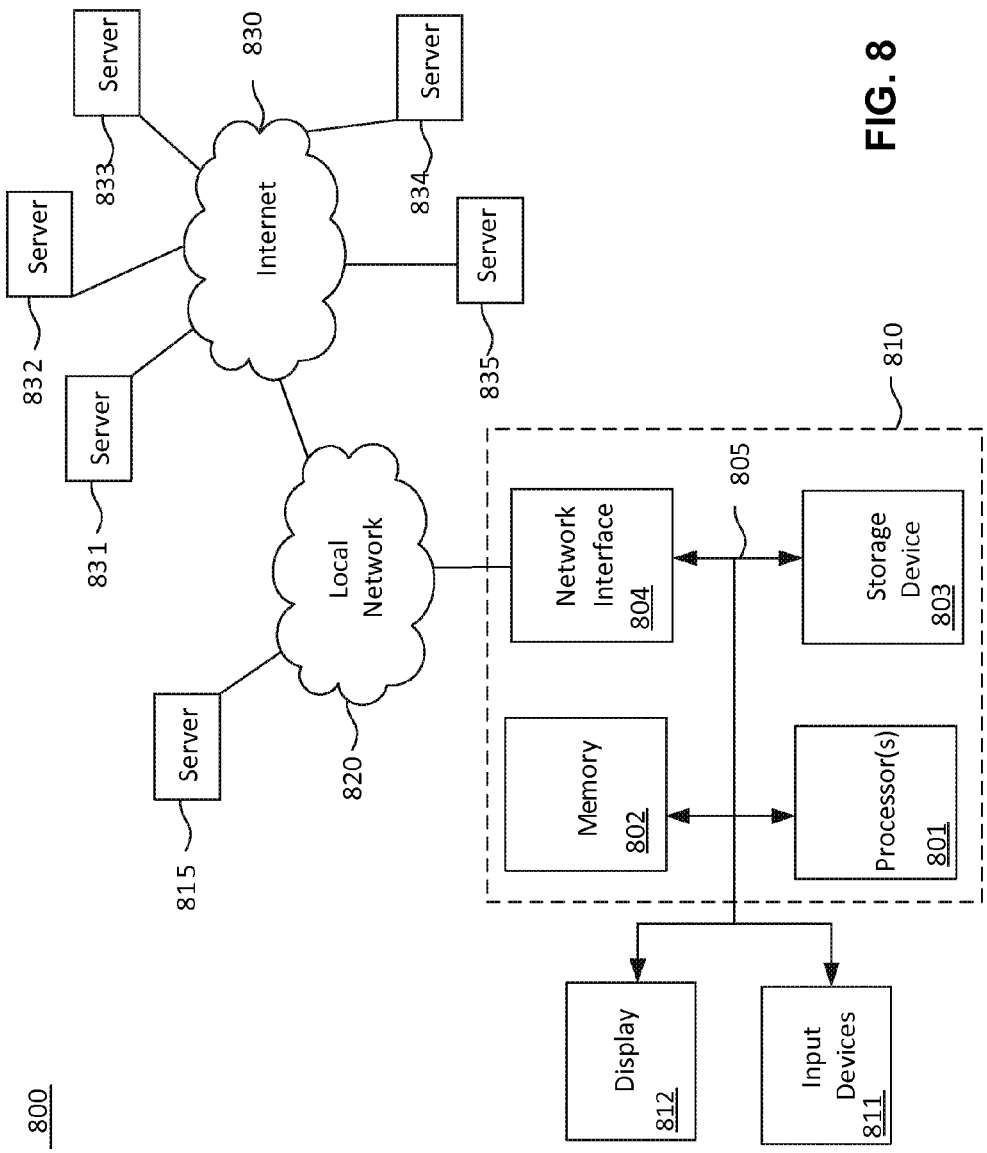
FIG. 8 illustrates an example of a computer system.

An example computer system 810 is illustrated in FIG. 8. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both.

A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable media. The computer system generally described in FIG. 8 includes at least those attributes described in FIG. 7.

Computer system 810 may be coupled via bus 805 to a display 812, such as a cathode ray tube (CRT) or liquid crystal display (LCD), for displaying information to a computer user. An input device 811 such as a touch screen, is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be for Broadband Wireless Access (BWA) technologies. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein.

In an example involving the Internet, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    providing a query expansion system comprising an engine, in communication with a user profile and with a business intelligence platform comprising a data warehouse, a multi-dimensional domain model, and a repository of documents;
    causing the query expansion system to receive a query posed by a user to the business intelligence platform, the query comprising a measure of the multi-dimensional domain model;
    causing the engine to determine a co-occurrence value for the query in the data warehouse based upon the repository of documents and a preference in the user profile, wherein determining the co-occurrence value comprises causing a second engine of the query expansion system to receive social/trust network information taking into account a relationship of the user to another entity in a social/trust network from the user profile to determine a collaborative co-occurrence value, wherein determining the collaborative co-occurrence value comprises applying a weight based upon a distance of the another entity from the user in the social/trust network information, wherein the social/trust network information comprises information from an enterprise directory; and
    causing the query expansion system to display to the user a query result based upon the collaborative co-occurrence value.

2. The method of claim 1 wherein:
    the query result is presented to the user as a first link to a first dimension of the multi-dimensional domain model, together with a second link to a second query result based upon a second dimension of the multi-dimensional domain model; and
    the user accesses the query result comprising a chart, by activating the first link.

3. The method of claim 1 wherein determining the co-occurrence value comprises defining a Jaccard index.

4. The method of claim 1 wherein the social/trust network information comprises information from a social network.

5. A non-transitory computer readable storage medium embodying a computer program for performing a method, said method comprising:
    providing a query expansion system comprising an engine, in communication with a user profile and with a business intelligence platform comprising a data warehouse, a multi-dimensional domain model, and a repository of documents;
    causing the query expansion system to receive a query posed by a user to the business intelligence platform, the query comprising a measure of the multi-dimensional domain model;
    causing the engine to determine a co-occurrence value for the query in the data warehouse based upon the repository of documents and a preference in the user profile;
    wherein determining the co-occurrence value comprises causing a second engine of the query expansion system to receive social/trust network information taking into account a relationship of the user to another entity in a social/trust network from the user profile to determine a collaborative co-occurrence value, wherein determining the collaborative co-occurrence value comprises applying a weight based upon a distance of the another entity from the user in the social/trust network information, wherein the social/trust network information comprises information from an enterprise directory; and
    causing the query expansion system to display to the user a query result based upon the collaborative co-occurrence value.

6. The non-transitory computer readable storage medium of claim 5 wherein:
    the query result is presented to the user as a first link to a first dimension of the multidimensional domain model, together with a second link to a second query result based upon a second dimension of the multi-dimensional domain model; and
    the user accesses the query result comprising a chart, by activating the first link.

7. The non-transitory computer readable storage medium of claim 5 wherein determining the co-occurrence value comprises defining a Jaccard index.

8. The non-transitory computer readable storage medium of claim 5 wherein the social/trust network information comprises information from a social network.

9. A computer system comprising:
    one or more processors;
    a software program, executable on said computer system, the software program configured to:
    communicate with a query expansion system comprising an engine, in communication with a user profile and with a business intelligence platform comprising a data warehouse, a multi-dimensional domain model, and a repository of documents;
    causing the query expansion system to receive a query posed by a user to the business intelligence platform, the query comprising a measure of the multi-dimensional domain model;
    causing the engine to determine a co-occurrence value for the query in the data warehouse based upon the repository of documents and a preference in the user profile;
    wherein determining the co-occurrence value comprises causing a second engine of the query expansion system to receive social/trust network information taking into account a relationship of the user to another entity in a social/trust network from the user profile to determine a collaborative co-occurrence value, wherein determining the collaborative co-occurrence value comprises applying a weight based upon a distance of the another entity from the user in the social/trust network information, wherein the social/trust network information comprises information from an enterprise directory; and
    causing the query expansion system to display to the user a query result based upon the collaborative co-occurrence value.

10. The computer system of claim 9 wherein:
    the query result is presented to the user as a first link to a first dimension of the multidimensional domain model, together with a second link to a second query result based upon a second dimension of the multi-dimensional domain model; and
    the user accesses the query result comprising a chart, by activating the first link.

11. The computer system of claim 9 wherein determining the co-occurrence value comprises defining a Jaccard index.

12. The computer system of claim 9 wherein the social/trust network information comprises information from a social network.

* * * * *